(12) United States Patent
Murakami et al.

(10) Patent No.: US 8,556,514 B2
(45) Date of Patent: Oct. 15, 2013

(54) SLIDING SUPPORT STRUCTURE FOR SHAFT MEMBER

(75) Inventors: Motoichi Murakami, Gotemba (JP); Shoji Miyazaki, Susono (JP); Yoshiki Ariizumi, Nisshin (JP); Ryuji Koike, Toyota (JP); Naoto Koyamaishi, Susono (JP); Shuzou Sanda, Nagoya (JP); Shigeru Hotta, Nagoya (JP); Katsuhiro Ashihara, Toyota (JP); Yasuhiro Hikita, Toyota (JP)

(73) Assignees: Toyota Jidosha Kabushiki Kaisha, Toyota-shi (JP); Taiho Kogyo Co., Ltd., Toyota (JP)

( * ) Notice: Subject to any disclaimer, the term of this patent is extended or adjusted under 35 U.S.C. 154(b) by 84 days.

(21) Appl. No.: 13/389,446

(22) PCT Filed: Aug. 31, 2010

(86) PCT No.: PCT/IB2010/002131
§ 371 (c)(1),
(2), (4) Date: Feb. 8, 2012

(87) PCT Pub. No.: WO2011/027202
PCT Pub. Date: Mar. 10, 2011

(65) Prior Publication Data
US 2012/0148180 A1 Jun. 14, 2012

(30) Foreign Application Priority Data
Sep. 1, 2009 (JP) .................................. 2009-201905

(51) Int. Cl.
*F16C 33/10* (2006.01)
(52) U.S. Cl.
USPC .......................................... 384/288; 384/294

(58) Field of Classification Search
USPC .......... 384/276, 286, 288, 289, 290, 294, 322
See application file for complete search history.

(56) References Cited

U.S. PATENT DOCUMENTS

| 2002/0085779 A1* | 7/2002 | Niwa et al. ..................... 384/294 |
| 2006/0120645 A1* | 6/2006 | Toth et al. ..................... 384/288 |

FOREIGN PATENT DOCUMENTS

| GB | 2 281 601 | 3/1995 |
| JP | 63 68514 | 5/1988 |
| JP | 5 209624 | 8/1993 |
| JP | 2006 138353 | 6/2006 |
| JP | 2006 329252 | 12/2006 |
| JP | 2007 192330 | 8/2007 |
| JP | 2007 211956 | 8/2007 |
| JP | 2008 223942 | 9/2008 |

OTHER PUBLICATIONS

International Search Report Issued Jan. 20, 2011 in PCT/IB10/02131 Filed Aug. 31, 2010.

* cited by examiner

*Primary Examiner* — Thomas R Hannon
(74) *Attorney, Agent, or Firm* — Oblon, Spivak, McClelland, Maier & Neustadt, L.L.P.

(57) ABSTRACT

A sliding support structure includes: a support member (12; 106) and a shaft member (10; 120) that relatively rotates with respect to the support member (12; 106) wherein lubricating oil is supplied to between a sliding surface of the shaft member and a sliding surface of the support member, the support member (12; 106) has a sliding surface portion (x) that corresponds to a load concentrating portion between the shaft member (10; 120) and the support member (12; 106), and sliding surface regions (Ya, Yb) that are higher in oil repellency than the sliding surface portion are respectively provided on upstream and downstream sides of the sliding surface portion in a flow direction of the lubricating oil.

9 Claims, 8 Drawing Sheets

RELATED ART

SLIDING SUPPORT STRUCTURE FOR SHAFT MEMBER

BACKGROUND OF THE INVENTION

1. Field of the Invention

The invention relates to a sliding support structure for a shaft member and, more particularly, to a sliding support structure for a shaft member, which is used for an internal combustion engine, or the like, and which supports a fluctuating load exerted between a sliding surface of the shaft member and a sliding surface of a support member.

2. Description of the Related Art

In general, in a sliding support structure for a shaft member, lubricating oil is supplied to between sliding surfaces of the relatively rotatable shaft member and support member to form a lubricating oil film. Then, a load is supported by an oil film pressure generated in the lubricating oil film to thereby reduce friction loss, prevent wear and seizure of the shaft member and support member and provide noise suppression effect owing to the cushioning function. It is known that these advantageous effects are remarkable as the thickness of the lubricating oil film between the sliding surfaces increases or as the amount of lubricating oil increases.

In order to increase the amount of lubricating oil between such sliding surfaces, there is proposed a technique for forming a large number of narrow grooves or linear marks on an inner peripheral surface of a bearing in a circumferential direction in parallel with one another. For example, Japanese Patent Application Publication No. 2006-329252 (JP-A-2006-329252) describes a rotational sliding structure between a shaft and a bearing in order to reduce energy loss due to shearing resistance of lubricating oil held between the shaft and the bearing. In the rotational sliding structure, circumferential grooves are formed on a rotational sliding surface of at least one of the shaft and the bearing, and an oil repellent film is formed on an inner surface of each groove.

In addition, Japanese Patent Application Publication No. 2007-211956 (JP-A-2007-211956) describes a bearing structure that sufficiently generates a bearing support pressure in a lubricating oil film. In the bearing structure, in a fluid machine, such as a vertical mixed flow pump, the sliding surface of a lower side bearing member and the sliding surface of an upper side bearing member are opposite via a fluid lubricating layer, at least one of the sliding surfaces has an oil-repellent first area that causes a slip flow and a lipophilic second area that causes a slip flow of 0 or smaller than that of the first area, and then the first area and the second area are alternately arranged in a sliding direction or the first area is scattered in the second area.

Note that Japanese Patent Application Publication No. 2007-192330 (JP-A-2007-192330) and Japanese Patent Application Publication No. 2008-223942 (JP-A-2008-223942) describe not a slide bearing but a rolling bearing. In the rolling bearing, grooves are formed on a rolling surface of at least one of raceway surfaces of inner and outer rings of the rolling bearing and rolling surfaces of rolling elements and then an oil repellent film is formed on the grooves.

Incidentally, in a sliding support structure used, for example, in an internal combustion engine for an automobile, the magnitudes and directions of loads exerted respectively on a shaft member and a support member fluctuate during one rotation of the shaft member or support member or during one operation cycle. Unless a predetermined oil film pressure is generated in a gap formed in correspondence with a direction in which the maximum fluctuating load of the fluctuating loads is exerted (hereinafter, this is termed load concentrating direction, and the sliding surfaces of the shaft member and support member, corresponding to the load concentrating direction, are termed load concentrating portions), so-called oil film shortage, or the like, occurs at that portions, resulting in a shift from fluid lubrication into mixed lubrication or boundary lubrication in which the shaft member partially directly contacts the support member. This may cause an increase in friction loss between the shaft member and the support member and, by extension, lead to wear, heating, seizure, or the like. Thus, usually, measures are taken in order to avoid such a situation. For example, a sufficient amount of lubricating oil is supplied, or the diameter of the shaft member and the diameter of the support member are increased or the width of the support member is increased so that the contact pressure between the shaft member and the support member decreases.

However, such measures lead to an increase in size and cost of the sliding support structure, so it is desirable that a sliding support structure generates a sufficient oil film pressure by the sliding support structure itself to thereby make it possible to reduce friction loss.

Note that the rotational sliding structure between the shaft and the bearing, described in JP-A-2006-329252, is a technique for reducing energy loss owing to shearing resistance of lubricating oil held between the shaft and the bearing, and JP-A-2006-329252 does not describe a case where the load concentrating portions are present. In addition, the bearing structure described in JP-A-2007-211956 is of a thrust bearing type in which a load is uniformly exerted on the sliding surfaces of the upper side bearing member and lower side bearing member from an upper side to a lower side, and JP-A-2007-211956 does not describe the type of bearing for a rotary shaft of which the sliding surface has a portion on which a load concentrates.

SUMMARY OF INVENTION

The invention provides a sliding support structure for a shaft member, which, even when there is a load concentrating portion, generates a sufficient oil film pressure at that portion to make it possible to reduce friction loss.

An aspect of the invention relates to a sliding support structure. The sliding support structure includes: a support member; and a shaft member that relatively rotates with respect to the support member, wherein lubricating oil is supplied to between a sliding surface of the shaft member and a sliding surface of the support member, the support member has a sliding surface portion that corresponds to a load concentrating portion between the shaft member and the support member, and sliding surface regions that are higher in oil repellency than the sliding surface portion are respectively provided on upstream and downstream sides of the sliding surface portion in a flow direction of the lubricating oil.

Here, the principle that an oil film pressure that is larger by the sliding support structure according to the aspect of the invention than by a sliding support structure according to a related art is generated in a gap corresponding to a load concentrating portion will be described with reference to FIG. 1 to FIG. 2B.

Figure 1:
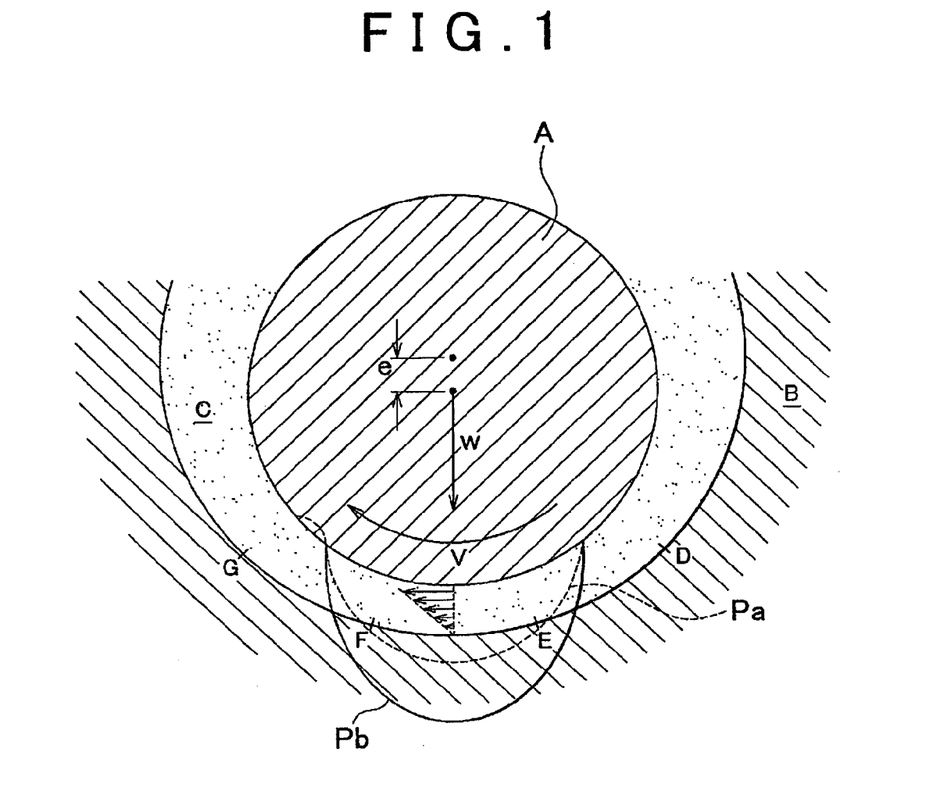
FIG. 1 is a schematic cross-sectional view that conceptually illustrates the principle of generation of an oil film pressure in a sliding support structure for relatively rotatable shaft member and support member.

In FIG. 1, A denotes a shaft member, B denotes a cylindrical support member that supports the shaft member A, and C denotes lubricating oil supplied to and interposed between the shaft member A and the support member B. Here, it is assumed that the shaft member A is rotating at a relative speed V in a clockwise direction indicated by the arrow inside the support member B while exerting a load W downward from above in the drawing. In this way, when a gap between the sliding surface of the shaft member A and the sliding surface of the support member B is narrowed by the load W exerted on the shaft member A, a drain of the lubricating oil C is inhibited because of its viscosity, so a throttle oil film pressure occurs in a lubricating oil film. At the same time, as the shaft member A rotates, the viscous lubricating oil C is drawn into between the shaft member A and the support member B, so a wedge oil film pressure occurs in the lubricating oil film. As shown in the drawing, the oil film pressure exhibits a pressure distribution (shown by the broken line Pa in FIG. 1) having a substantially convex center portion of a minimum gap portion (substantially between E and F, placing an intersection of the direction of the load W and the sliding surface of the support member B in FIG. 1 in between) between the shaft member A and the support member B. Thus, the shaft member A is supported on the support member B by an oil film pressure that occurs in the gap between the shaft member A and the support member B.

Figure 2A:
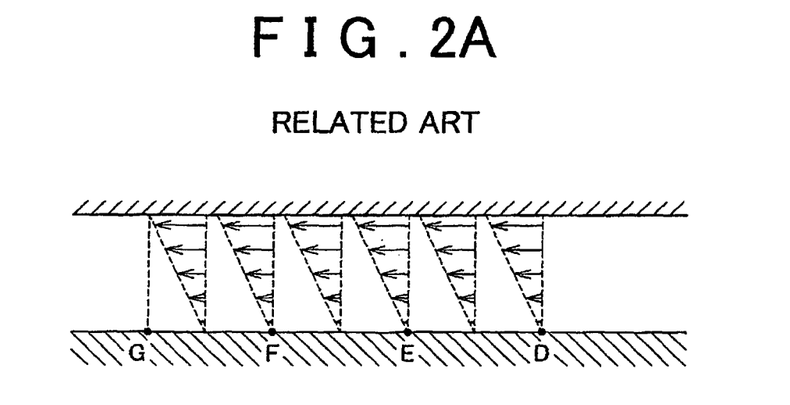
FIG. 2A is a velocity profile of lubricating oil around a minimum gap portion in a sliding support structure for a rotary shaft according to a related art.
Figure 2B:
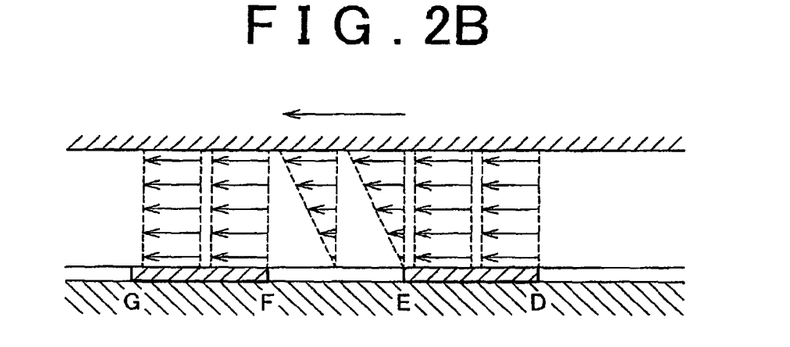
FIG. 2B is a velocity profile of lubricating oil around a minimum gap portion in a sliding support structure for a rotary shaft according to an embodiment of the invention.

Here, in a sliding support structure according to a related art in which the above described load W does not fluctuate, that is, a constant load is exerted on the shaft member A and the support member B, the size of the minimum gap portion is also maintained substantially at constant, so the lubricating oil C flowing therethrough has the velocity distribution shown in FIG. 2A as the shaft member A rotates, and the flow rate also substantially remains unchanged at constant. Furthermore, the lubricating oil C tends to stagnate at the minimum gap portion because of its viscosity; however, force that separates the lubricating oil C from the sliding surface of the support member B is exerted because of the flow having the above described velocity distribution, so a negative pressure occurs in the lubricating oil film downstream of the minimum gap portion (substantially between F and G in FIG. 1), causing cavitation.

Incidentally, even when the above described load W fluctuates and the minimum gap portion shown in FIG. 1 is formed by the maximum load, an oil film pressure also occurs, as in the case of the constant load. However, in the sliding support structure for a shaft member according to the aspect of the invention, because regions that are higher in oil repellency than the other region are provided in upstream (substantially between D and E in FIG. 1) and downstream (substantially between F and G in FIG. 1) sliding surface regions in a lubricating oil flow direction, placing the sliding surface portion (substantially between E and F in FIG. 1) corresponding to the load concentrating portion in between, the velocity distribution at the minimum gap portion and the upstream and downstream sides of the minimum gap portion in the rotation direction, that is, the lubricating flow direction, is as shown in FIG. 2B. That is, in the sliding surface region (substantially between D and E in FIG. 1) upstream of the sliding surface portion of the support member B in the above described lubricating oil flow direction, a slip occurs between a high oil repellent region and lubricating oil, so the velocity of lubricating oil at a side that is in contact with the shaft member A is substantially equal to the velocity of lubricating oil at a side that is in contact with the support member B and, therefore, the average velocity in the gap is high and, by extension, the flow rate also increases. In contrast, at the sliding surface portion (substantially between E and F in FIG. 1) that corresponds to the load concentrating portion, the velocity of lubricating oil and the flow rate of lubricating oil are maintained without increasing the velocity or flow rate of lubricating oil, so, as a result of balance in flow rate, an oil film pressure that is higher than that in the related art is generated in the gap corresponding to the load concentrating portion. The pressure distribution at this time is indicated by the solid line Pb in FIG. 1. On the other hand, in the sliding surface region (substantially between F and G in FIG. 1) downstream of the sliding surface portion of the support member B in the above described rotation direction or the lubricating oil flow direction, a slip occurs between the high oil repellent region and lubricating oil to thereby facilitate separation of lubricating oil from the support member B, so generation of a negative pressure in the lubricating oil film is suppressed.

Thus, with the sliding support structure for a shaft member according to the aspect of the invention, when the gap between the relatively rotatable shaft member and support member is narrowed because of concentration of a load therebetween, flow of lubricating oil in the lubricating oil film is controlled by the regions that are higher in oil repellency than the other region and that are provided in the sliding surface regions upstream and downstream of the sliding surface portion that corresponds to the load concentrating portion in the flow direction of lubricating oil, so an oil film pressure is increased and generation of a negative pressure in the oil film is prevented. Hence, it is possible to effectively reduce friction loss due to viscous drag of lubricating oil.

Note that, here, in the aspect of the sliding support structure for a shaft member, the sliding surface portion may be subjected to non-oil repellent treatment to be formed into a non-oil repellent surface, and the sliding surface regions may be subjected to oil repellent treatment to be formed into oil repellent surfaces.

According to the above aspect, because the sliding surface is formed without a step between the non-oil repellent surface and the oil repellent surface, it is possible to further reduce friction loss.

In the above configuration, the oil repellent surfaces of the support member may be formed except parts of both axial ends of the support member.

According to the above aspect, because the amount of lubricating oil that leaks from the oil repellent surfaces of the support member toward both axial ends of the support member is reduced, it is possible to reduce the axial or widthwise size of the support member when an equivalent oil film pressure is obtained.

Here, the shaft member may be a main journal of a crankshaft or camshaft, the support member may be a journal bearing, and the oil repellent surfaces may be formed on a sliding surface of the journal bearing.

In the above configuration, the sliding surface portion of the journal bearing, placed between the oil repellent surfaces, may be located at a position at which a thickness of lubricating oil between the main journal and the journal bearing is minimal.

Note that the shaft member may be a piston pin that couples a piston to a connecting rod in a full floating type, the support member may be a pin boss of the piston, and the oil repellent surfaces may be formed on a sliding surface of the pin boss.

In this case, the sliding surface portion of the sliding surface of the pin boss, placed between the oil repellent surfaces, may be a position at which the sliding surface of the pin boss intersects with a plane that includes a central axis of the piston and a central axis of the pin boss.

According to the aspect of the invention, when the gap between the shaft member and the support member is narrowed because of concentration of a load therebetween, flow of lubricating oil in the lubricating oil film is controlled by the regions that are higher in oil repellency than the other region and that are provided in the sliding surface regions upstream and downstream of the sliding surface portion, which corresponds to the load concentrating portion of the sliding surface of at least one of the shaft member and the support member, in the flow direction of lubricating oil, so an oil film pressure is increased and generation of a negative pressure in the oil film is prevented. Hence, it is possible to reduce friction loss due to viscous drag of lubricating oil.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings.

Figure 3:
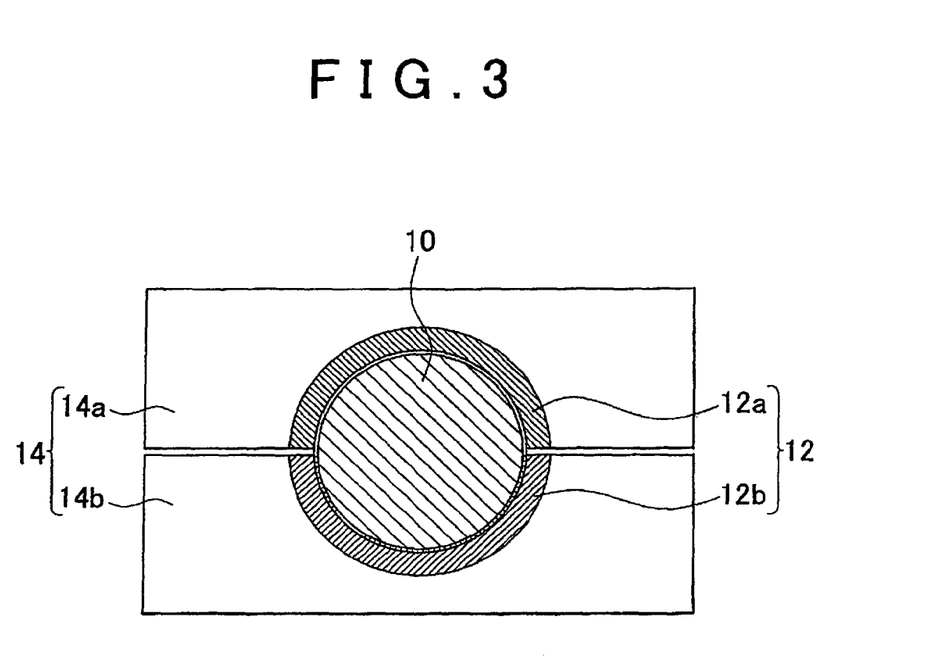
FIG. 3 is a cross-sectional view of a sliding support structure for a rotary shaft in a crankshaft of an engine according to an embodiment of the invention.

First, a sliding support structure for a crankshaft of an engine according to an embodiment of the invention will be described with reference to FIG. 3. As shown in FIG. 3, the sliding support structure includes a main journal 10 of the crankshaft and a journal bearing 12. The main journal 10 serves as a rotating shaft member. The journal bearing 12 serves as a support member or a bearing member for rotatably supporting the main journal 10. The journal bearing 12 is fixedly held by an upper housing 14a and a lower housing 14b. The upper housing 14a is formed in a cylinder block (not shown). The lower housing 14b is formed in a bearing cap and is fastened to the upper housing 14a. Note that, in the present embodiment, the journal bearing 12 is also formed of an upper journal bearing 12a and a lower journal bearing 12b. Then, the main journal 10 and the journal bearing 12 formed of the upper journal beating 12a and the lower journal bearing 12b are set to have a predetermined gap therebetween over the entire circumference, and lubricating oil is supplied to the gap via an oil passage (not shown).

Figure 4A:
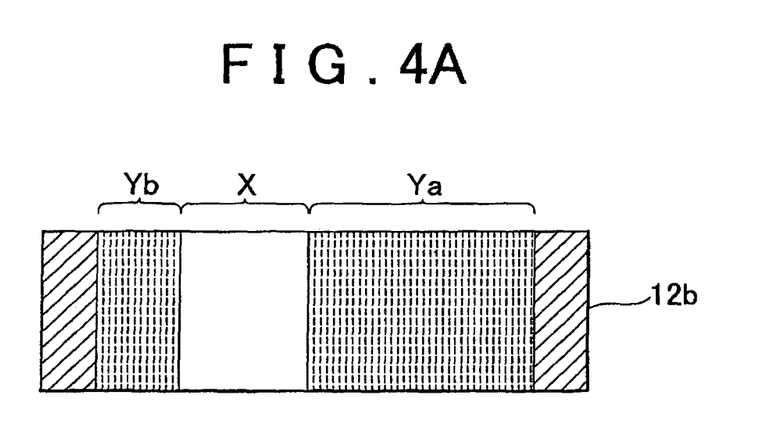
FIG. 4A is a top view of a first embodiment of a bearing member in the embodiment shown in FIG. 3.
Figure 4B:
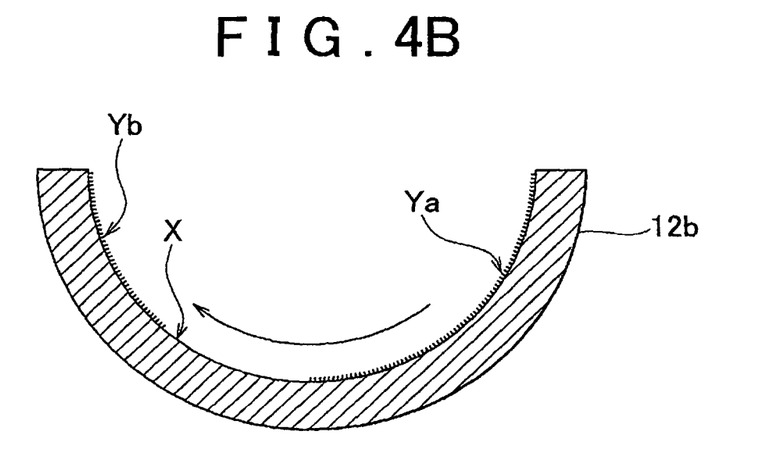
FIG. 4B is a side view of the first embodiment of the bearing member.

Then, as shown in FIG. 4A and FIG. 4B, in the journal bearing 12 that serves as a first embodiment of the bearing member according to the present embodiment, on the sliding surface of the inner periphery of the lower journal bearing 12b, a sliding surface portion X corresponding to a load concentrating portion between the main journal 10 and the lower journal bearing 12b has a non-oil repellent or low oil repellent surface; whereas, oil repellent surfaces are formed in sliding surface regions Ya and Yb upstream and downstream of the sliding surface portion X in a rotation direction of the main journal 10, that is, a flow direction of lubricating oil (indicated by the arrow in FIG. 4B).

Note that the load concentrating portion between the main journal 10 and the lower journal bearing 12b means a portion corresponding to a direction in which an maximum load is exerted on the journal bearing 12 within a fluctuating load that varies during one rotation of the main journal 10 in accordance with a load exerted from a drive system on the crankshaft. Then, the main journal 10 is decentered in this direction inside the journal bearing 12, and a minimum gap portion, that is, a minimum oil film thickness portion, is formed at the sliding surface portion X. Note that, in the case of the crankshaft, the minimum oil film thickness portion is determined on the basis of an operating condition, and the portion may be estimated in advance.

Thus, in the embodiment shown in FIG. 4A and FIG. 4B, the center of the sliding surface portion X that has a non-oil repellent or low oil repellent surface and that corresponds to the load concentrating portion is set so as to deviate by a predetermined angle (for example, 30 to 40 degrees) from the lowest point of the lower journal bearing 12b toward a downstream side in the rotation direction (indicated by the arrow in FIG. 4B) of the main journal 10. Then, the sliding surface region Ya upstream of the sliding surface portion X in the rotation direction of the main journal 10 is formed as an oil repellent surface from the right end of the lower journal bearing 12b to the starting end of the sliding surface portion X and the sliding surface region Yb downstream of the sliding surface portion X in the rotation direction of the main journal 10 is formed as an oil repellent surface from the terminal end of the sliding surface portion X to the left end of the lower journal bearing 12b.

The operation of the thus configured present embodiment will be described. It is assumed that the main journal 10 is rotating in a clockwise direction in the drawing while being supplied with lubricating oil via the oil passage (not shown). The supplied lubricating oil flows similarly in the clockwise direction through the gap formed between the journal bearing 12 and the main journal 10 along the oil repellent sliding surface region Ya in accordance with the rotation of the main journal 10. At this time, as described above, the velocity of lubricating oil that is in contact with the main journal 10 and the velocity of lubricating oil that is in contact with the oil repellent sliding surface region Ya of the lower journal bearing 12b are substantially equal to each other, the average velocity in the gap is high and, by extension, the flow rate also increases. In contrast, at the sliding surface portion X that corresponds to the load concentrating portion and that has a non-oil repellent or low oil repellent surface, the velocity of lubricating oil and the flow rate of lubricating oil are maintained without increasing the velocity or flow rate of lubricating oil, so, as a result of balance in flow rate, an oil film pressure Pb that is higher than that in the related art is generated in the gap at the sliding surface portion X corresponding to the load concentrating portion (see FIG. 1). The main journal 10 is raised in the radial direction of the main journal 10 by the high oil film pressure Pb. Thus, it is possible to increase the minimum thickness of the oil film, and it is possible to reduce the decentering amount of the main journal 10.

On the other hand, on the downstream side of the sliding surface portion X of the lower journal bearing 12b in the above rotation direction, a slip occurs between the oil repellent sliding surface region Yb and lubricating oil to thereby facilitate separation of lubricating oil from the lower journal bearing 12b, so generation of a negative pressure in the lubricating oil film is suppressed. This negative pressure generation suppressing function can reduce viscous drag to rotation of the main journal 10.

Next, a second embodiment of the journal bearing 12 that serves as a support member or a bearing member will be described with reference to FIG. 5A and FIG. 5B. The second embodiment differs from the first embodiment only in that an oil repellent surface is provided except parts of both axial ends of the journal bearing 12, so like reference numerals denote similar functional portions to those of the first embodiment and the overlap description is omitted.

Figure 5A:
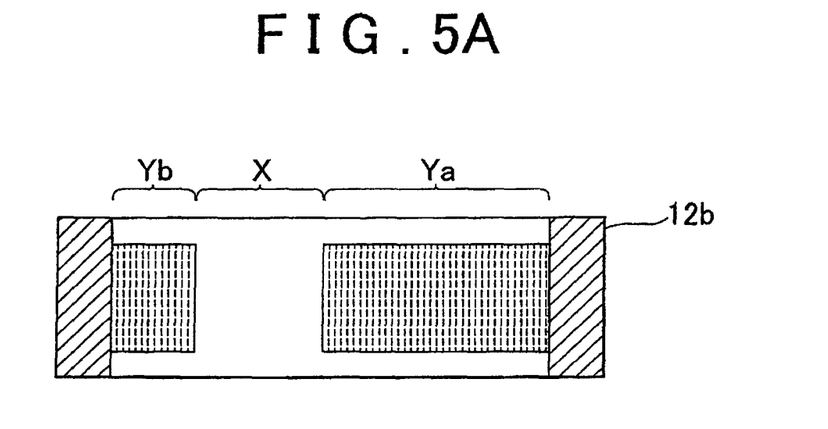
FIG. 5A is a top view of a second embodiment of a bearing member in the embodiment shown in FIG. 3.
Figure 5B:
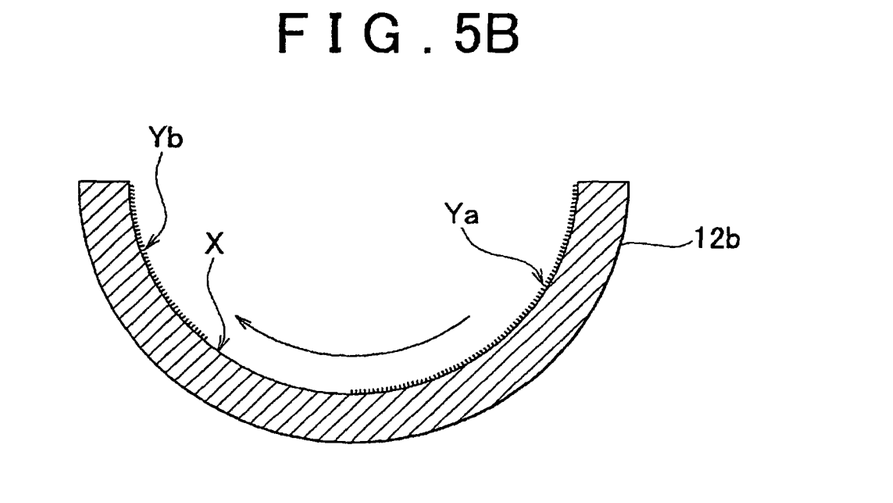
FIG. 5B is a side view of the second embodiment of the bearing member.

That is, FIG. 5A is a top view of the lower journal bearing 12b, and FIG. 5B is a side view of the lower journal bearing 12b. In the second embodiment, sliding surface regions Ya and Yb having an oil repellent surface are formed on both upstream side and downstream side in the rotation direction of the main journal 10 or the flow direction of lubricating oil with respect to the sliding surface portion X that corresponds to the load concentrating portion and that has a non-oil repellent or low oil repellent surface except both axial ends.

With the second embodiment, the amount of leakage of lubricating oil from the oil repellent sliding surface regions Ya and Yb of the lower journal bearing 12b toward both axial ends is reduced, so it is possible to reduce the axial size or width of the journal bearing 12 when an oil film pressure equivalent to that of the first embodiment is obtained.

Here, when the sliding surface portion X having a non-oil repellent or low oil repellent surface and the sliding surface regions Ya and Yb having an oil repellent surface are formed, a high oil repellent material may be applied to only the sliding surface regions Ya and Yb without any treatment applied to the sliding surface portion X or a non-oil repellent or low oil repellent material and a high oil repellent material may be applied respectively to the sliding surface portion X and the sliding surface regions Ya and Yb.

Note that the high oil repellent material may be fluoroalkylsilane. For example, a mixed solution of ethanol, tetraethoxysilane, fluoroalkylsilane and hydrochloric acid solution is applied to the sliding surface regions Ya and Yb and then fired at about 200° C. for about 30 minutes in an atmospheric furnace. By so doing, a silanol group (O—Si—O; glass layer $SiO_2$) is firmly formed on a base material (for example, iron) of the journal bearing, and a high oil repellent Rf group (fluorine) is formed at the terminal of the silanol group, that is, the surface. Thus, the high oil repellent sliding surface is obtained.

In addition, the non-oil repellent or low oil repellent material may be a mixed solution that excludes fluoroalkylsilane from the above mixed solution, and similarly fired after being applied to the sliding surface portion X. By so doing, only the silanol group (O—Si—O; glass layer $SiO_2$) is formed on the base material of the journal bearing, so the non-oil repellent or low oil repellent sliding surface may be obtained.

Note that, when the non-oil repellent or low oil repellent material and the high oil repellent material are applied to the respective different portions at the same time, for example, a mixed solution of ethanol, tetraethoxysilane, fluoroalkylsilane and hydrochloric acid solution and a mixed solution of ethanol, tetraethoxysilane and hydrochloric acid solution are applied to the different portions of a roller surface, the mixed solutions on the roller surface are transferred to the lower journal bearing 12b and then fired. By so doing, the sliding surface may be formed without a step between the non-oil repellent or low oil repellent surface and the high oil repellent surface. Specifically, the Rf group at the surface of the high oil repellent film has a thickness of about several nanometers, and is extremely thinner than the silanol group (O—Si—O) that is common to both films and that has a thickness of 60 to 200 nm, so, macroscopically, there is almost no difference in thickness of both films and it is possible to obtain the sliding surface having a smooth film. Thus, it is possible to further reduce friction loss.

Next, a sliding support structure for relatively rotatable shaft member and support member in a piston according to an embodiment of the invention will be described.

Figure 6:
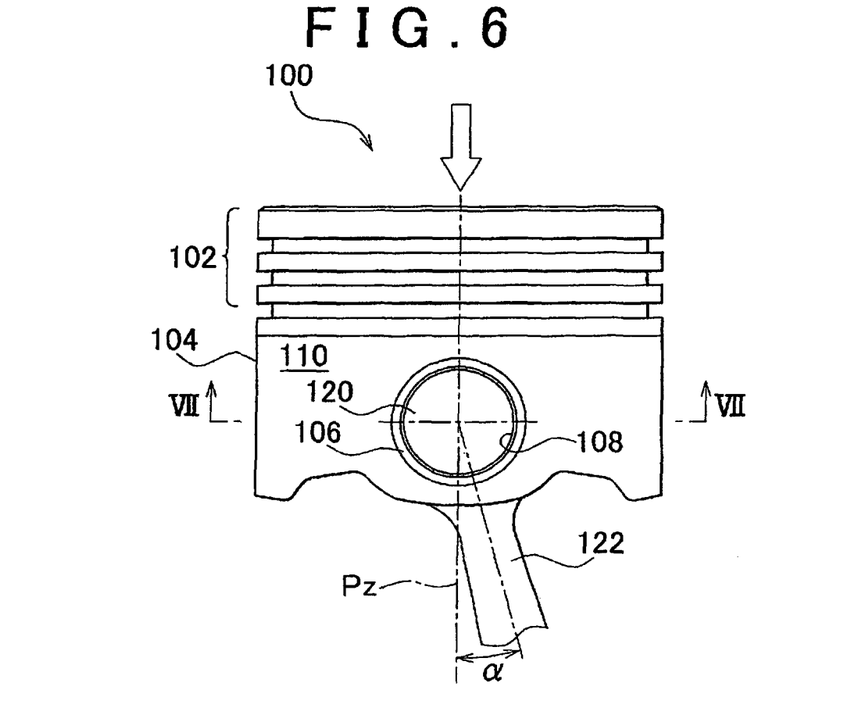
FIG. 6 is a side view of a sliding support structure for relatively rotatable shaft member and support member in a piston of the engine according to an embodiment of the invention.

As shown in FIG. 6, a piston 100 according to the present embodiment includes a piston land 102, skirt portions 104 and piston pin bosses (hereinafter, referred to as pin bosses) 106. The piston land 102 has a plurality of outer peripheral grooves to which piston rings are fitted. The skirt portions 104 and the pin bosses 106 are located below the piston land 102. A piston pin 120, which will be described later, is fitted to the pin bosses 106. The pin bosses 106 have piston pin holes 108, each of which has an axis that is substantially parallel to the longitudinal direction of the crankshaft. Then, the pin bosses 106 are integrally formed with side walls 110 that are arranged parallel to each other so as to be perpendicular to the axes of the piston pin holes 108, and both ends of the side walls 110 are formed continuously with the skirt portions 104.

Then, the above described piston pin 120 couples the piston 100 to a connecting rod 122 so that the piston pin 120 is fitted in a small end hole of the connecting rod 122, of which a large end is coupled to a pin of the crankshaft, and both ends of the piston pin 120 are fitted to the piston pin holes 108 of the pin bosses 106.

Figure 7:
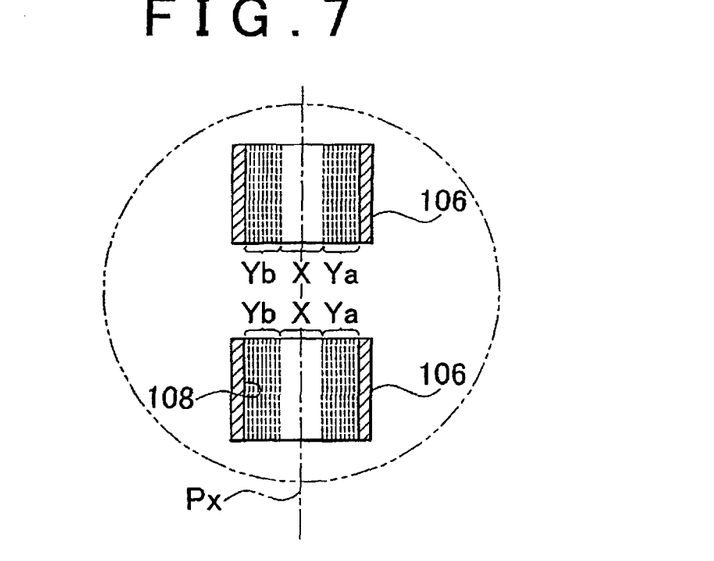
FIG. 7 is a cross-sectional view of the support member in the embodiment shown in FIG. 6, taken along the line VII-VII in FIG. 6.

Here, the piston pin 120 that serves as the shaft member in the embodiment related to the piston is coupled to the piston 100 and the connecting rod 122 in a so-called full floating type in which the piston pin 120 is relatively rotatable with respect to both the piston pin holes 108 of the pin bosses 106 of the piston 100 and the small end hole of the connecting rod 122. Then, in the present embodiment, as shown in FIG. 7, oil repellent surfaces are formed on sliding surfaces of the piston pin holes 108 of the pin bosses 106 that serve as the support members. More specifically, on the sliding surface of each of the piston pin holes 108 of the pin bosses 106, a sliding surface portion in a predetermined range of 106b to 106d (see FIG. 8A), including a position 106c at which the sliding surface intersects with a plane that includes both a central axis Pz of the piston 100 and a central axis Px of the piston pin holes 108 of the pin bosses 106 at the center, is formed to be a sliding surface portion X having a non-oil repellent or low oil repellent surface; whereas, a sliding surface portion in a range of 106a to 106b and a sliding surface portion in a range of 106d to 106e that are located on both sides of the sliding surface portion X are respectively formed to be sliding surface portions Ya and Yb having an oil repellent surface.

The operation of the embodiment related to the piston will be described. It is assumed that the piston 100 is reciprocally moving up and down while lubricating oil is supplied to the piston pin holes 108 of the pin bosses 106. At this time, when the crankshaft is rotating in the clockwise direction, at the second half of an upward movement stroke of the piston 100, starting from the lowest position of the pin of the crankshaft, and at the first half of a downward movement stroke of the piston 100, starting from the highest position of the pin of the crankshaft, the piston pin 120 rotates in the counterclockwise direction with respect to the pin bosses 106, and, at the second half of the downward movement stroke and the first half of the upward movement stroke other than the above, the piston pin 120 rotates in the clockwise direction.

Figure 8A:
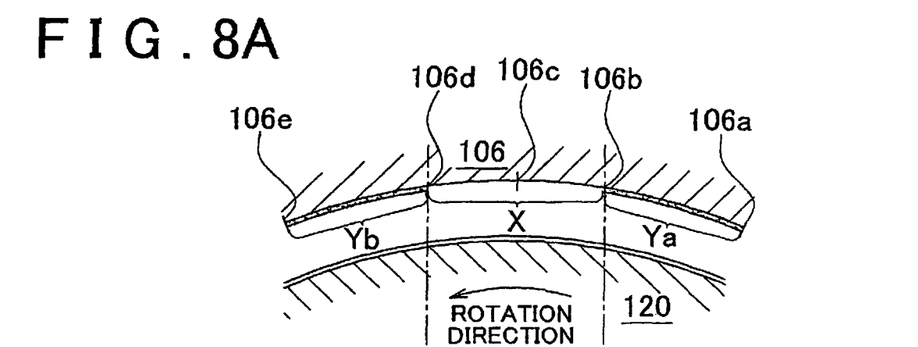
FIG. 8A is a cross-sectional view that shows the relationship between the shaft member and the support member in the sliding support structure for the relatively rotatable shaft member and support member in the piston of the engine according to the embodiment of the invention.

Here, a load due to a combustion pressure acts on the piston 100 when the piston 100 moves downward, and, in the piston pin 120 and the pin bosses 106, the sliding surface portion in the predetermined range of 106b to 106d, including the position 106c at which the sliding surface intersects with the plane that includes the central axis Pz of the piston 100 and the central axis Px of the piston pin holes 108 of the pin bosses 106 at the center, becomes the load concentrating portion. Note that, with the reciprocal upward and downward movements of the piston 100, the radial position of the load concentrating portion with respect to the center of the piston pin 120 fluctuates with respect to the piston pin 120; however, the radial position of the load concentrating portion is constant at a radial position 106c corresponding to the central axis Pz of the piston 100 with respect to the pin bosses 106.

Figure 8B:
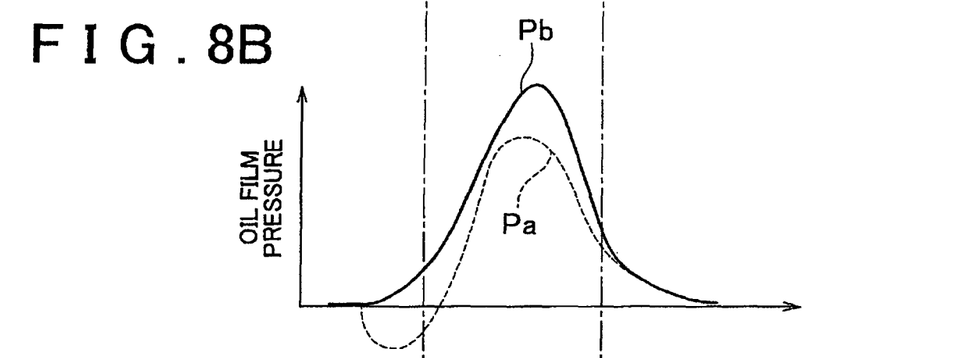
FIG. 8B is a graph for illustrating a state where an oil film pressure is generated by rotation of the shaft member.
Figure 8C:
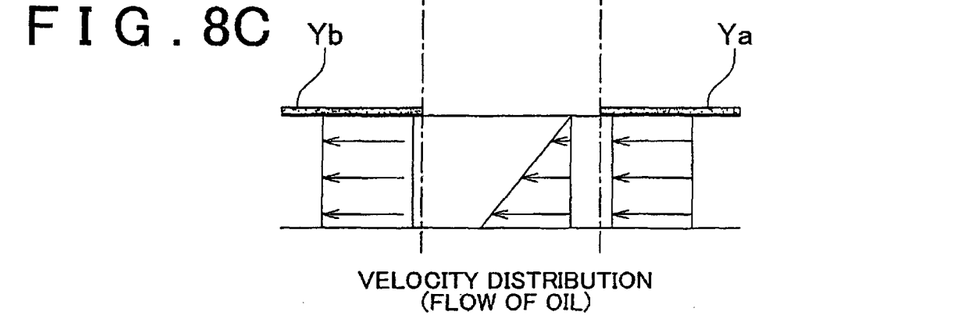
FIG. 8C is a velocity profile of lubricating oil.

Then, as shown in FIG. 8A, when it is assumed that the piston pin 120 is rotating in the counterclockwise direction at the first half of the downward movement stroke of the piston 100, supplied lubricating oil flows similarly in the counterclockwise direction in the gap formed between the piston pin 120 and the piston pin holes 108 of the pin bosses 106 as the piston pin 120 rotates. At this time, as shown in FIG. 8C, the velocity of lubricating oil at a side that is in contact with the upstream sliding surface portion Ya of the pin boss 106 having an oil repellent surface is substantially equal to the velocity of lubricating oil at a side that is in contact with the piston pin 120 and, therefore, the average velocity in the gap is high and, by extension, the flow rate also increases. In contrast, at the sliding surface portion X that corresponds to the load concentrating portion and that has a non-oil repellent or low oil repellent surface, the velocity of lubricating oil and the flow rate of lubricating oil are maintained without increasing the velocity or flow rate of lubricating oil, so, as a result of balance in flow rate, as shown in FIG. 8B, an oil film pressure Pb (solid line) that is higher than an oil film pressure Pa (broken line) in the related art may be generated in the gap that corresponds to the load concentrating portion. Owing to the large oil film pressure Pb, the piston pin 120 is radially inwardly distanced to make it possible to increase the minimum oil film thickness, so it is possible to improve the anti-seizure property of the piston pin 120.

On the other hand, on the downstream side in the above rotation direction with respect to the sliding surface portion X of each pin boss 106 having a non-oil repellent or low oil repellent surface, a slip occurs between the oil repellent sliding surface region Yb and lubricating oil to thereby facilitate separation of lubricating oil from the pin bosses 106, so generation of a negative pressure in the lubricating oil film is suppressed. This negative pressure suppressing function can reduce viscous drag to rotation of the piston pin 120, so it is possible to reduce friction loss.

Figure 9A:
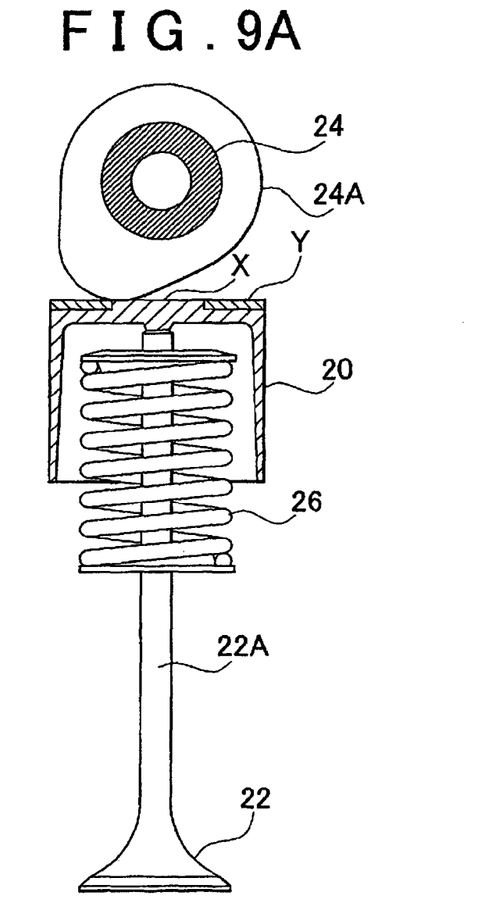
FIG. 9A is a schematic front view of a valve lifter of the engine according to an embodiment of the invention.
Figure 9B:
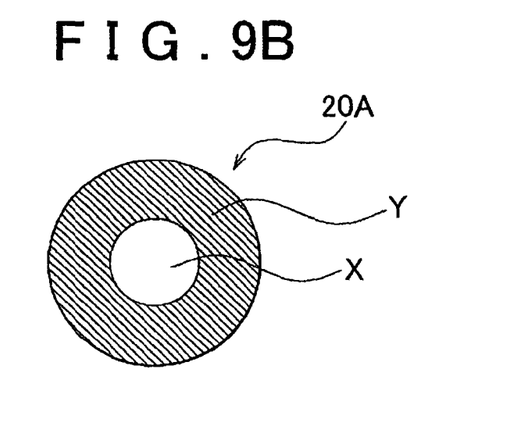
FIG. 9B is a top view of the valve lifter.
Figure 9C:
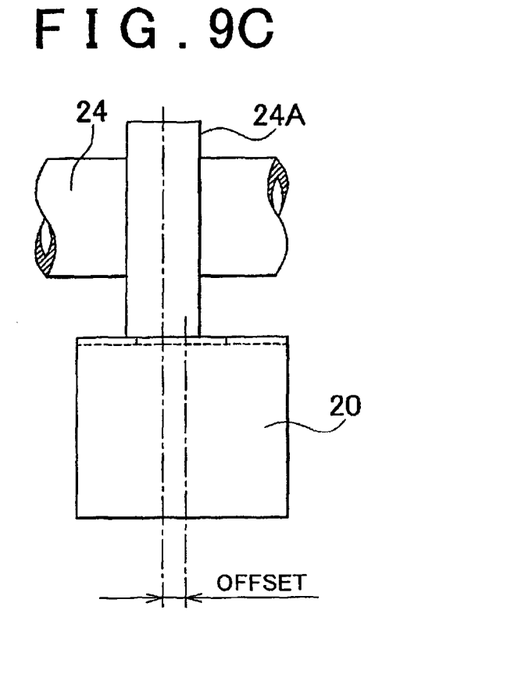
FIG. 9C is a side view of the valve lifter.

Furthermore, valve lifters of the engine according to an embodiment of the invention will be described with reference to FIG. 9A to FIG. 9C.

Here, each of the valve lifters of the engine is a component that converts the rotating movement of a cam into a reciprocating movement and then transmits power to a valve. Each valve lifter, for example, has a cylindrical shape having a closed-end at one side. As shown in FIG. 9A, the inner bottom portion of the valve lifter 20 is brought into contact with an end portion of a stem 22A of the valve 22, the valve lifter 20 is driven to open the valve 22 by the cam 24A formed integrally with a camshaft 24 that is driven in synchronization with rotation of the crankshaft, and the valve lifter 20 is urged to close the valve 22 by a valve spring 26. Then, as shown in FIG. 9C, usually, these valve lifters 20 are configured so that the center of the cam 24A is offset from the center of the valve lifter 20 and, each time the cam 24A contacts the valve lifter 20 to lift the valve 22, the valve lifter 20 is rotated little by little to prevent one-side wear of a contact portion.

Then, in the embodiment related to the valve lifters of the engine, an oil repellent surface is formed on a sliding surface of a top surface 20A of each valve lifter 20. Specifically, as shown in FIG. 9B, a sliding surface portion Y having an annular oil repellent surface is formed at a peripheral portion of the top surface 20A except the center portion. On the other hand, the center portion of the top surface 20A is formed to be a sliding surface portion X that has a substantially circular non-oil repellent or low oil repellent surface.

The operation of the embodiment related to the valve lifters 20 of the engine will be described. It is assumed that the camshaft 24 is rotating in the counterclockwise direction in the drawing while lubricating oil is supplied by an oil supply device (not shown) to a contact portion between the cam 24A and the valve lifter 20. At this time, as the cam 24A rotates, the contact portion between the cam 24A and the valve lifter 20 moves from a contact start position at which a cushioning portion close to a base circle of the cam 24A contacts a peripheral portion of the top surface 20A of the valve lifter 20 via a maximum lift position at which a lifting portion of the cam 24A contacts a center portion of the top surface 20A of the valve lifter 20 again to a contact end position at which the cushioning portion close to the base circle of the cam 24A contacts the peripheral portion of the top surface 20A of the valve lifter 20. Thus, in the case of the valve lifter 20, the maximum lift position on which a maximum load is exerted, that is, the center portion of the top surface 20A of the valve lifter 20, becomes a load concentrating portion.

Lubricating oil supplied here flows similarly in the counterclockwise direction in the gap formed between the cam 24A and the valve lifter 20 as the camshaft 24 rotates. At this time, as described above, the velocity of lubricating oil at a side that contacts the sliding surface portion Y of the cam 24A having an oil repellent surface is substantially equal to the velocity of lubricating oil at a side that contacts the valve lifter 20, so the average velocity in the gap increases and, by extension, the flow rate increases. In contrast, at the sliding surface portion X that corresponds to the load concentrating portion and that has a non-oil repellent or low oil repellent surface, the velocity of lubricating oil and the flow rate of lubricating oil are maintained without increasing the velocity or flow rate of lubricating oil, so, as a result of balance in flow rate, an oil film pressure Pb that is higher than that in the related art is generated in the gap corresponding to the load concentrating portion. This large oil pressure Pb is able to increase the minimum oil film thickness in the gap between the cam 24A and the valve lifter 20, resulting in a shift from boundary lubrication into fluid lubrication to thereby make it possible to reduce viscous drag, that is, friction, therebetween. As a result, wear of the contact portion, that is, sliding portion, between the cam 24A and the valve lifter 20 reduces.

On the other hand, on the downstream side in the above described rotation direction with respect to the sliding surface portion X of the valve lifter 20 having a non-oil repellent or low oil repellent surface, a slip occurs between the oil repellent sliding surface region Yb and lubricating oil to facilitate separation of lubricating oil from the valve lifter 20, so generation of a negative pressure in the lubricating oil film is suppressed. This negative pressure generation suppressing function can reduce viscous drag to rotation of the cam 24A.

Note that, in the above described embodiment related to the valve lifters 20, the center portion of the top surface 20A is formed to be the sliding surface portion X having a substantially circular non-oil repellent or low oil repellent surface, and the sliding surface portion Y having an annular oil repellent surface is formed at the peripheral portion except the center portion of the top surface 20A. This may be, for example, embodied in a slight. different form in which the sliding surface portion X having a non-oil repellent or low oil repellent surface is provided at a position offset from the center portion of the top surface 20A, or the like. This is because, as described above, the center of the cam 24A is offset from the center of the valve lifter 20 and the valve lifter 20 rotates little by little, so the cam 24A does not necessarily contact the center of the valve lifter 20 at a high load.

The inventions claims is:

1. A sliding support structure comprising:
a support member; and
a shaft member that relatively rotates with respect to the support member, wherein:
lubricating oil is supplied to between a sliding surface of the shaft member and a sliding surface of the support member; and
the support member has a sliding surface portion that corresponds to a load concentrating portion between the shaft member and the support member, and sliding surface regions that are higher in oil repellency than the sliding surface portion are respectively provided on upstream and downstream sides of the sliding surface portion in a flow direction of the lubricating oil.

2. The sliding support structure according to claim 1, wherein:
the sliding surface portion is subjected to non-oil repellent treatment to be formed into a non-oil repellent surface; and
the sliding surface regions are subjected to oil repellent treatment to be formed into oil repellent surfaces.

3. The sliding support structure according to claim 2, wherein the oil repellent surfaces of the support member are formed except parts of both axial ends of the support member.

4. The sliding support structure according to claim 2, wherein:
the shaft member is a main journal of a crankshaft;
the support member is a journal bearing; and
the oil repellent surfaces are formed on a sliding surface of the journal bearing.

5. The sliding support structure according to claim 4, wherein the sliding surface portion of the journal bearing, placed between the oil repellent surfaces, is located at a position at which a thickness of lubricating oil between the main journal and the journal bearing is minimal.

6. The sliding support structure according to claim 2, wherein:
the shaft member is a main journal of a camshaft;
the support member is a journal bearing; and
the oil repellent surfaces are formed on a sliding surface of the journal bearing.

7. The sliding support structure according to claim 6, wherein the sliding surface portion of the journal bearing, placed between the oil repellent surfaces, is located at a position at which a thickness of lubricating oil between the main journal and the journal bearing is minimal.

8. The sliding support structure according to claim 2, wherein:
the shaft member is a piston pin that couples a piston to a connecting rod in a full floating type;
the support member is a pin boss of the piston; and
the oil repellent surfaces are formed on a sliding surface of the pin boss.

9. The sliding support structure according to claim 8, wherein the sliding surface portion of the sliding surface of the pin boss, placed between the oil repellent surfaces, is located at which the sliding surface of the pin boss intersects with a plane that includes a central axis of the piston and a central axis of the pin boss.

* * * * *